United States Patent
Riegel et al.

(10) Patent No.: US 7,981,969 B2
(45) Date of Patent: Jul. 19, 2011

(54) POSTCROSSLINKING OF WATER-ABSORBING POLYMERS

(75) Inventors: Ulrich Riegel, Landstuhl (DE); Thomas Daniel, Waldsee (DE); Matthias Weismantel, Jossgrund-Oberndorf (DE); Mark Elliott, Ludwigshafen (DE); Dieter Hermeling, Böhl-Iggelheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1096 days.

(21) Appl. No.: 10/588,671

(22) PCT Filed: Feb. 18, 2005

(86) PCT No.: PCT/EP2005/001673
§ 371 (c)(1),
(2), (4) Date: Aug. 8, 2006

(87) PCT Pub. No.: WO2005/080479
PCT Pub. Date: Sep. 1, 2005

(65) Prior Publication Data
US 2007/0161759 A1    Jul. 12, 2007

(30) Foreign Application Priority Data
Feb. 24, 2004    (DE) .......................... 10 2004 009 438

(51) Int. Cl.
C08J 3/24     (2006.01)
C08F 20/06    (2006.01)

(52) U.S. Cl. ................ 525/330.2; 525/329.7; 525/329.9; 525/330.1; 525/360; 525/367; 525/371; 525/374; 525/375; 525/379; 525/382; 525/383; 525/384

(58) Field of Classification Search ............... 525/329.7, 525/329.9, 330.1, 330.2, 360, 367, 371, 374, 525/375, 379, 382, 383, 384
See application file for complete search history.

(56) References Cited

U.S. PATENT DOCUMENTS

| | | | |
|---|---|---|---|
| 4,666,983 A | 5/1987 | Tsubakimoto et al. | |
| 5,331,059 A | 7/1994 | Engelhardt et al. | |
| 5,385,983 A | 1/1995 | Graham | |
| 5,599,335 A | 2/1997 | Goldman et al. | |
| 6,239,230 B1 | 5/2001 | Eckert et al. | |
| 6,472,478 B1 | 10/2002 | Funk et al. | |
| 6,503,979 B1 | 1/2003 | Funk et al. | |
| 6,559,239 B1 | 5/2003 | Riegel et al. | |
| 6,602,950 B1 | 8/2003 | Dentler et al. | |
| 6,605,673 B1 | 8/2003 | Mertens et al. | |
| 6,620,889 B1 | 9/2003 | Mertens et al. | |
| 6,657,015 B1 | 12/2003 | Riegel et al. | |
| 6,831,142 B2 | 12/2004 | Mertens et al. | |
| 2002/0128618 A1* | 9/2002 | Frenz et al. | 604/368 |
| 2002/0165288 A1* | 11/2002 | Frenz et al. | 521/50 |
| 2004/0231065 A1 | 11/2004 | Daniel et al. | |
| 2004/0265387 A1* | 12/2004 | Hermeling et al. | 424/486 |

FOREIGN PATENT DOCUMENTS

| | | |
|---|---|---|
| CA | 2426514 | 3/2003 |
| DE | 19807992 | 7/1999 |
| DE | 19807502 | 9/1999 |
| DE | 19846412 | 4/2000 |
| DE | 19854573 | 5/2000 |
| DE | 19854574 | 5/2000 |
| EP | 083022 | 7/1983 |
| EP | 372981 | 6/1990 |
| EP | 530438 | 3/1993 |
| EP | 543303 | 5/1993 |
| EP | 1165631 | 1/2002 |
| EP | 1169372 | 1/2002 |
| EP | 1516884 | 3/2005 |
| WO | WO 02/20068 | 3/2002 |
| WO | WO 02/22717 | 3/2002 |
| WO | WO 03/031482 | 4/2003 |

OTHER PUBLICATIONS

International Search Report in PCT/EP2005/001673, dated Jun. 15, 2005.

* cited by examiner

*Primary Examiner* — Roberto Rabago
(74) *Attorney, Agent, or Firm* — Marshall, Gerstein & Borun LLP

(57) ABSTRACT

The invention concerns a process for producing water-absorbing polymer, which comprises a base polymer A being mixed with a first aqueous solution B of at least one surface postcrosslinker and a second aqueous solution C of at least one polyvalent cation and thermally treated, wherein said base polymer A is based on at least 50% neutralized acid-functional monomer and said solutions B and C are metered wholly or partly concurrently through separate nozzles whereby a water-absorbing polymer having a high saline flow conductivity value is obtained.

9 Claims, No Drawings

POSTCROSSLINKING OF WATER-ABSORBING POLYMERS

CROSS-REFERENCE TO RELATED APPLICATIONS

This is the U.S. national phase application of International Application No. PCT/EP2005/001673, filed Feb. 18, 2005, which claims the benefit of German patent application No. 10 2004 009 438.1, filed Feb. 24, 2004.

The present invention relates to a process for postcrosslinking water-absorbing polymers.

Postcrosslinking is to be understood as referring to the gel or secondary crosslinking of water-absorbing hydrogels.

Hydrophilic, highly swellable hydrogels are in particular polymers of (co)polymerized hydrophilic monomers, graft (co)polymers of one or more hydrophilic monomers on a suitable grafting base, crosslinked cellulose ethers, crosslinked starch ethers, crosslinked carboxymethylcellulose, partially crosslinked polyalkylene oxide or natural products which are swellable in aqueous fluids, such as guar derivatives for example. Such hydrogels are used as products capable of absorbing aqueous solutions to manufacture diapers, tampons, sanitary napkins and other hygiene articles, but also as water retainers in market gardening.

Hydrophilic, highly swellable hydrogels are hydrogels having a CRC value [g/g] of preferably above 15, especially above 20, more preferably above 25, especially above 30, even more preferably above 35. The CRC value [g/g] of the inventive crosslinked swellable hydrogel-forming polymers can be measured by the methods indicated in the description part.

To improve performance properties, for example diaper saline flow conductivity (SFC) and absorbency under load (AUL), hydrophilic, highly swellable hydrogels are generally surface or gel postcrosslinked. This postcrosslinking is preferably carried out in the aqueous gel phase or as postcrosslinking of the ground and classified polymeric particles.

Useful crosslinkers for this purpose are compounds which contain at least two groups capable of forming covalent bonds with the carboxyl groups of the hydrophilic polymer. Examples of suitable compounds are di- or polyglycidyl compounds, such as diglycidyl phosphonates, alkoxysilyl compounds, polyaziridines, polyamines and polyamidoamines, and these compounds can also be used in mixtures with each other (see for example EP-A-0 083 022, EP-A-0 543 303 and EP-A-0 530 438).

Known crosslinkers also include polyfunctional alcohols. For instance, U.S. Pat. No. 4,666,983 and also U.S. Pat. No. 5,385,983 teach the use of hydrophilic polyalcohols and the use of polyhydroxy surfactants respectively. The reaction in these references is carried out at high temperatures in the range from 120 to 250° C. The process has the disadvantage that the esterification reaction which leads to crosslinking is very slow even at these temperatures.

Furthermore, compounds described as suitable crosslinkers include 2-oxazolidone and its derivatives in DE-A-198 07 502, morpholine-2,3-dione and its derivatives in WO-A-03/031482, 2-oxotetrahydro-1,3-oxazine and its derivatives in DE-A-198 54 573, N-acyl-2-oxazolidones in DE-A-198 54 574 and bis- and poly-2-oxazolidinones in DE-A-198 07 992.

Moreover, U.S. Pat. No. 6,239,230 describes β-hydroxyalkylamides as useful crosslinkers. They are indeed highly suitable for use in hygiene articles. Their disadvantage is the relatively high use levels needed and the associated costs.

EP-A-0 372 981 teaches the conjoint use of a postcrosslinker and of a polyvalent metal ion. The examples utilize a solution consisting of glycerol, aluminum sulfate and water.

EP-A-1 165 631, EP-A-1 169 372, WO-A-02/20068 and WO-A-02/22717 likewise describe the conjoint use of a postcrosslinker and of a polyvalent metal ion. There is a stated preference for the use of a solution and for the sole use of water as a solvent.

DE-A-198 46 412 describes the production of an acidic hydrogel which, after neutralization and drying, is treated with a postcrosslinker and a polyvalent cation. Postcrosslinker and polyvalent cation are metered in a conjoint solution in the examples.

One disadvantage with the abovementioned processes is the large amount of postcrosslinker and polyvalent cation which has to be used to achieve a high SFC value for the postcrosslinked polymer, especially the large amount of postcrosslinker needed. A further appreciable disadvantage is the base polymer's severe tendency to cake on admixture of the solution comprising the postcrosslinker and the polyvalent cation and potentially cause relatively rapid plugging of the mixer.

None of the processes cited above teaches how products having a fine particle size distribution and yet a very high permeability might be produced.

Such finely granular superabsorbents facilitate in particular the production of very thin diapers having little if any cellulose pulp content.

The present invention has for its object to provide a postcrosslinking process without the abovementioned disadvantages. More particularly, the postcrosslinked water-absorbing polymers shall have a high saline flow conductivity (SFC). The process shall not require high use level of postcrosslinker and polyvalent cation. More particularly, the amount of the costly postcrosslinker used shall be low.

The present invention further has for its object to provide a process wherein the caking tendency of the base polymer during postcrosslinking is diminished, postcrosslinking here referring not only to the admixture of the solution but also to the thermal postcrosslinking operation.

The present invention has for its object in particular to provide a superabsorbent polymer having a fine particle size distribution, i.e., no coarse constituents having particle sizes above 600 μm, and yet having a high permeability and absorption capacity.

We have found that this object is achieved, surprisingly, by a process which comprises a base polymer A based on an at least 50% neutralized acid-functional monomer being mixed with a first aqueous solution B of at least one surface postcrosslinker and a second aqueous solution C of at least one polyvalent cation and thermally treated, wherein said said solutions B and C are metered wholly or partly concurrently through separate nozzles.

When, for example, the metering of solution B is started at a time $t_{B1}$, and ended at a time $t_{B2}$ and the metering of solution C is started at time $t_{C1}$, and ended at a time $t_{C2}$, partly concurrently is to be understood as meaning for the case $t_{B1} \leq t_{C1}$, that $t_{C1} \leq t_{B2}$ and for the case of $t_{B1} > t_{C1}$, that $t_{B1} < t_{C2}$, the relative overlap between the metering periods being typically not less than 5%, preferably not less than 25%, more preferably not less than 50% and most preferably not less than 95%. Relative overlap between the metering periods refers to the quotient, in %, formed from the period during which the two solutions B and C are metered concurrently and the period during which at least one solution was metered.

When, for example, $t_{B1}=0$ minutes, $t_{B2}=15$ minutes, $t_{C1}=5$ minutes and $t_{C2}=20$ minutes, the relative overlap between the metering periods is given by $(15-5)/(20-0)=50\%$.

The metering periods can in effect be offset, commence at the same time, end at the same time or be such that one metering period is embedded in the other.

Solutions B and C are said to be metered concurrently when the overlap between the metering periods is not less than 95%.

The process of the present invention leads to optimum results when the aqueous solutions B and C are applied concurrently but unmixed to the base polymer A, i.e., the particles of the base polymer A are ideally treated with the two solutions separately but at proximate times.

The aqueous solution B may typically comprise a cosolvent as well as the at least one postcrosslinker. The cosolvent itself is not a postcrosslinker, i.e., compounds useful as a cosolvent may at most form one bond to at most one carboxyl group. Useful cosolvents include alcohols other than polyols, $C_1$-$C_6$ alcohols, such as methanol, ethanol, n-propanol, isopropanol, n-butanol, sec-butanol, tert-butanol or 2-methyl-1-propanol, ketones, such as acetone, or carboxylic esters, such as ethyl acetate. Preferred cosolvents include $C_1$-$C_3$ alcohols, and particular preference is given to n-propanol and isopropanol.

The concentration of cosolvent in the aqueous solution B, based on the solution B, is frequently in the range from 15% to 50% by weight, preferably in the range from 15% to 40% by weight and more preferably in the range from 20% to 35% by weight. In the case of cosolvents which have limited miscibility with water, it will be advantageous to adjust the aqueous solution B such that only one phase is present, if appropriate by lowering the concentration of the cosolvent.

Preferably, the aqueous solution B comprises at least two mutually distinct postcrosslinkers. More preferably, the aqueous solution B comprises at least one postcrosslinker which is not a polyol and at least one polyol.

Useful postcrosslinkers for the process of the present invention include for example ethylene glycol diglycidyl ether, diethylene glycol diglycidyl ether, polyethylene glycol diglycidyl ether, propylene glycol diglycidyl ether, dipropylene glycol diglycidyl ether, polypropylene glycol diglycidyl ether, glycerol diglycidyl ether, polyglycerol diglycidyl ether, epichlorohydrin, ethylenediamine, ethylene glycol, diethylene glycol, triethylene glycol, polyethylene glycol, propylene glycol, dipropylene glycol, tripropylene glycol, polypropylene glycol, butylene glycol, 1,3-propanediol, 1,4-butanediol, bisphenol A, glycerol, trimethylolpropane, pentaerythritol, sorbitol, diethanolamine, triethanolamine, ethylenediamine, ethylene carbonate, propylene carbonate, 2-oxazolidones, such as 2-oxazolidinone or N-hydroxyethyl-2-oxazolidinone, morpholine-2,3-diones, such as N-2-hydroxyethylmorpholine-2,3-dione, N-methylmorpholine-2,3-dione, N-ethylmorpholine-2,3-dione and/or N-tert-butylmorpholine-2,3-dione, 2-oxotetrahydro-1,3-oxazine, N-acyl-2-oxazolidones, such as N-acetyl-2-oxazolidone, bicyclic amide acetals, such as 5-methyl-1-aza-4,6-dioxabicyclo[3.3.0]octane, 1-aza-4,6-dioxa-bicyclo[3.3.0]octane and/or 5-isopropyl-1-aza-4,6-dioxabicyclo[3.3.0]octane, and/or bis- and poly-2-oxazolidinones. Preference is given to using 2-oxazolidones, such as 2-oxazolidinone or N-hydroxyethyl-2-oxazolidinone, and diols, such as ethylene glycol and propylene glycol. Very particular preference is given to using 2-oxazolidinone and propylene glycol and also N-hydroxyethyl-2-oxazolidinone and propylene glycol.

The concentration of the at least one postcrosslinker in the aqueous solution B, based on the solution B, is for example in the range from 1% to 30% by weight, preferably in the range from 3% to 20% by weight and more preferably in the range from 5% to 15% by weight. The use level based on base polymer A is for example in the range from 0.01% to 1% by weight, preferably in the range from 0.05% to 0.5% by weight and more preferably in the range from 0.1% to 0.25% by weight.

Useful polyvalent cations for the process of the present invention include for example divalent cations, such as the cations of zinc, magnesium, calcium and strontium, trivalent cations, such as the cations of aluminum, iron, chromium, rare earths and manganese, tetravalent cations, such as the cations of titanium and zirconium. Useful counter-ions include chloride, bromide, sulfate, hydrogensulfate, carbonate, bicarbonate, nitrate, phosphate, hydrogenphosphate, dihydrogenphosphate and carboxylate, such as acetate and lactate. Aluminum sulfate is preferred.

The aqueous solution C typically includes no cosolvent.

The concentration of the at least one polyvalent cation in the aqueous solution C, based on the solution C, is for example in the range from 0.1% to 12% by weight, preferably in the range from 0.5% to 8% by weight and more preferably in the range from 1.5% to 6% by weight. The use level based on base polymer A is for example in the range from 0.001% to 0.5% by weight, preferably in the range from 0.005% to 0.2% by weight and more preferably in the range from 0.02% to 0.1% by weight.

The ratio of solution B to solution C is typically in the range from 10:1 to 1:10, preferably in the range from 5:1 to 1:5 and more preferably in the range from 4:1 to 1:1.

The total amount of solutions B and C based on base polymer A is typically between 2.5% to 6.5% by weight and preferably between 3% and 5% by weight.

A preferred embodiment comprises the base polymer A having added to it a surfactant as a deagglomerating assistant, for example sorbitan monoester, such as sorbitan monococoate and sorbitan monolaurate. The deagglomerating assistant can be metered separately or added to solution B or to solution C. Preferably, the deagglomerating assistant is added to solution B or to solution C and more preferably it is added to solution B.

The amount of deagglomerating assistant used based on base polymer A is for example in the range from 0% to 0.01% by weight, preferably in the range from 0% to 0.005% by weight and more preferably in the range from 0% to 0.002% by weight. The deagglomerating assistant is preferably added in such an amount that the surface tension of an aqueous extract of the swollen base polymer A and/or of the swollen water-absorbing polymer at 23° C. is not less than 0.060 N/m, preferably not less than 0.062 N/m and more preferably not less than 0.65 N/m. The surface tension of the aqueous extract is advantageously not more than 0.072 N/m.

Spray nozzles useful for the process of the present invention are not subject to any restriction. The liquid to be spray dispensed may be fed to such nozzles under pressure. The atomizing of the liquid to be spray dispensed may in this case be effected by decompressing the liquid in the nozzle bore after the liquid has reached a certain minimum velocity. Also useful for the purposes of the present invention are one-material nozzles, for example slot nozzles or swirl or whirl chambers (full-cone nozzles), available for example from Düsen-Schlick GmbH, Germany, or from Spraying Systems Deutschland GmbH, Germany.

Preference for the purposes of the present invention is given to full-cone nozzles having a spray-cone opening angle in the range from 60 to 180° and more preferably in the range from 90 to 120°. For the purposes of the present invention, the average droplet diameter which results on spraying is advantageously <1000 μm, preferably <200 μm and more preferably <100 μm and also advantageously >10 μm, preferably >20 μm and more preferably >50 μm. The spray-nozzle throughput is advantageously in the range from 0.1 to 10 m³/h and frequently in the range from 0.5 to 5 m³/h. Before they land on the substrate, droplets typically travel on average from 0.1 to 2 m, frequently from 0.2 to 1 m and preferably from 0.3 to 0.5 m under large-scale industrial conditions.

Excessively large droplets would mean a less than optimal distribution on the base polymer A and the need to use a disproportionately large amount of solutions B and C to achieve a certain effect. Excessively small droplets, in contrast, increase the tendency for caking in the mixer, possibly because the capture cross-section increases with the sum total of the droplets and hence there is an increased probability that droplets of solutions B and C will mix before landing on the substrate.

Following spraying, the polymer powder is thermally dried, and the crosslinking reaction can take place not only before but also during drying. Preference is given to spray application of a solution of the crosslinker in reaction mixers or mixing and drying systems such as for example Lödige mixers, BEPEX® mixers, NAUTA® mixers, SCHUGGI® mixers or PROCESSALL®. Moreover, fluidized bed dryers can also be used. It is particularly preferable for solutions B and C to be applied to the base polymer A in a high-speed mixer, for example of the type Schuggi-Flexomix® or Turbolizer®, and be thermally aftertreated in a reaction dryer, for example of the type Nara-Paddle-Dryer® or a disk dryer. The postcrosslinking and drying temperature range extends preferably from 30 to 200° C., especially from 100 to 200° C. and more preferably from 160 to 190° C.

Drying may take place in the mixer itself, by heating the outer casing or by blowing hot air into the mixer. It is similarly possible to use a downstream dryer such as a tray dryer, a rotary tube dryer or a heatable screw. But it is also possible, for example, to use an azeotropic distillation as a drying process. The preferred residence time at this temperature in the reaction mixer or dryer is less than 120 minutes, more preferably less than 90 minutes and most preferably less than 60 minutes.

The hydrophilic, highly swellable hydrogels (base polymer A) to be used in the process of the present invention are in particular polymers of crosslinked (co)polymerized hydrophilic monomers, polyaspartic acid, graft (co)polymers of one or more hydrophilic monomers on a suitable grafting base, crosslinked cellulose ethers, crosslinked starch ethers or natural products which are swellable in aqueous fluids, such as guar derivatives for example. Preferably the polymer to be crosslinked is a polymer which contains structural units which are derived from acrylic acid or acrylic esters or which were obtained by graft copolymerization of acrylic acid or acrylic esters onto a water-soluble polymeric matrix. These hydrogels are known to one skilled in the art and are described for example in U.S. Pat. No 4,286,082, DE-C-27 06 135, U.S. Pat. No. 4,340,706, DE-C-37 13 601, DE-C-28 40 010, DE-A-43 44 548, DE-A-40 20 780, DE-A-40 15 085, DE-A-39 17 846, DE-A-38 07 289, DE-A-35 33 337, DE-A-35 03 458, DE-A-42 44 548, DE-A-42 19 607, DE-A40 21 847, DE-A-38 31 261, DE-A-35 11 086, DE-A-31 18 172, DE-A-30 28 043, DE-A-44 18 881, EP-A-0 801 483, EP-A-0 455 985, EP-A-0 467 073, EP-A-0 312 952, EP-A-0 205 874, EP-A-0 499 774, DE-A 26 12 846, DE-A-40 20 780, EP-A-0 205 674, U.S. Pat. No. 5,145,906, EP-A-0 530 438, EP-A-0 670 073, U.S. Pat. Nos. 4,057,521, 4,062,817, 4,525,527, 4,295,987, 5,011,892, 4,076,663 or 4,931,497.

Examples of hydrophilic monomers useful for preparing these swellable hydrogel-forming polymers are polymerization-capable acids, such as acrylic acid, methacrylic acid, vinylsulfonic acid, vinylphosphonic acid, maleic acid including its anhydride, fumaric acid, itaconic acid, 2-acrylamido-2-methylpropanesulfonic acid, 2-acrylamido-2-methylpropanephosphonic acid and also their amides, hydroxyalkyl esters and amino- or ammonio-containing esters and amides and also the alkali metal and/or ammonium salts of the acid-functional monomers. Also suitable are water-soluble N-vinylamides such as N-vinylformamide or else diallyldimethylammonium chloride. Preferred hydrophilic monomers are compounds of the general formula I

where
$R^1$ is hydrogen, $C_1$-$C_4$-alkyl, methyl or ethyl, or carboxyl,
$R^2$ is —COOR$^4$, hydroxysulfonyl or phosphonyl, a $C_1$-$C_4$-alkanol-esterified phosphonyl group or a group of the formula II

$R^3$ is hydrogen, $C_1$-$C_4$-alkyl, for example methyl or ethyl,
$R^4$ is hydrogen, $C_1$-$C_4$-aminoalkyl, $C_1$-$C_4$-hydroxyalkyl, alkali metal ion or ammonium ion, and
$R^5$ is a sulfonyl group, a phosphonyl group or a carboxyl group or an alkali metal or ammonium salt of each of these.
Examples of $C_1$-$C_4$-alkanols are methanol, ethanol, n-propanol, isopropanol or n-butanol.

Preferred hydrophilic monomers are acid-functional monomers, preferably partially neutralized, i.e., from 50% to 100%, preferably from 60% to 90% and more preferably from 70% to 80% of the acid groups are neutralized.

Particularly preferred hydrophilic monomers are acrylic acid and methacrylic acid and also their alkali metal or ammonium salts, for example sodium acrylate, potassium acrylate or ammonium acrylate.

Suitable grafting bases for hydrophilic hydrogels obtainable via graft copolymerization of olefinically unsaturated acids or their alkali metal or ammonium salts may be of natural or synthetic origin. Examples are starch, cellulose or cellulose derivatives and also other polysaccharides and oligosaccharides, polyalkylene oxides, in particular polyethylene oxides and polypropylene oxides, and also hydrophilic polyesters.

Suitable polyalkylene oxides have for example the formula III

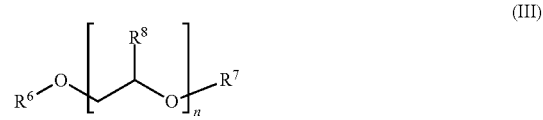

where
$R^6$ and $R^7$ are each independently hydrogen, $C_1$-$C_{12}$-alkyl, for example methyl, ethyl, n-propyl or isopropyl, $C_2$-$C_{12}$-alkenyl, for example ethenyl, n-propenyl or isopropenyl, $C_7$-$C_{20}$-aralkyl, for example phenylmethyl, 1-phenylethyl or 2-phenylethyl, or aryl, for example 2-methylphenyl, 4-methylphenyl or 4-ethylphenyl,
$R^8$ is hydrogen or methyl, and
n is an integer from 1 to 10 000.
$R^6$ and $R^7$ are each preferably hydrogen, $C_1$-$C_4$-alkyl, $C_2$-$C_6$-alkenyl or phenyl.

Preferred hydrogels are in particular polyacrylates, polymethacrylates and also the graft polymers described in U.S. Pat. Nos. 4,931,497, 5,011,892 and 5,041,496.

The swellable hydrogel-forming polymers are preferably in crosslinked form; that is, they include compounds having at least two double bonds which have been copolymerized into the polymer network. Suitable crosslinkers are in particular N,N'-methylenebisacrylamide and N,N'-methylenebismethacrylamide, esters of unsaturated mono- or polycarboxylic acids of polyols, such as diacrylate or triacrylate, examples being the diacrylates and dimethacrylates of butanediol and ethylene glycol and also trimethylolpropane triacrylate and allyl compounds such as allyl (meth)acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described for example in EP-A-0 343 427. The process of the present invention may further utilize hydrogels which are prepared using polyallyl ethers as crosslinkers and by acidic homopolymerization of acrylic acid. Suitable crosslinkers are pentaerythritol triallyl ether, pentaerythritol tetraallyl ether, polyethylene glycol diallyl ether, ethylene glycol diallyl ether, glycerol diallyl ether, glycerol triallyl ether, polyallyl ethers based on sorbitol, and also ethoxylated variants thereof.

The preferred methods of making the base polymer which can be used in the process of the present invention are described in "Modern Superabsorbent Polymer Technology", F. L. Buchholz and A. T. Graham, Wiley-VCH, 1998, pages 77 to 84. Particular preference is given to base polymers which are produced in a kneader as described for example in WO-A-01/38402 or on a belt reactor as described for example in EP-A-0 955 086.

The water-absorbing polymer is preferably a polymeric acrylic acid or a polyacrylate. This water-absorbing polymer may be prepared according to a literature method. Preference is given to polymers which contain crosslinking comonomers in amounts from 0.001 to 10 mol % and preferably from 0.01 to 1 mol %, but most preference is given to polymers which were obtained by free-radical polymerization using a polyfunctional ethylenically unsaturated free-radical crosslinker which additionally bears at least one free hydroxyl group (such as for example pentaerythritol triallyl ether, trimethylolpropane diallyl ether, glyceryl diacrylate).

The swellable hydrogel-forming polymers are preparable by conventional polymerization processes. Preference is given to addition polymerization in aqueous solution by the process known as gel polymerization. In this process from 15 to 50% by weight aqueous solutions of one or more hydrophilic monomers and if appropriate of a suitable grafting base are polymerized in the presence of a free-radical initiator, preferably without mechanical mixing, by utilizing the Trommsdorff-Norrish effect (Makromol. Chem. 1, 169 (1947)). The addition polymerization reaction may be carried out in the temperature range between 0 and 150° C. and preferably between 10 and 100° C., not only at atmospheric pressure but also at elevated or reduced pressure. As customary, the addition polymerization may also be carried out in a protective gas atmosphere, preferably under nitrogen and/or water vapor. The addition polymerization may be initiated using high-energy electromagnetic radiation or the customary chemical addition polymerization initiators, for example organic peroxides, such as benzoyl peroxide, tert-butyl hydroperoxide, methyl ethyl ketone peroxide, cumene hydroperoxide, azo compounds such as azodiisobutyronitrile and also inorganic peroxo compounds such as $(NH_4)_2S_2O_8$, $K_2S_2O_8$ or $H_2O_2$. They may if appropriate be used in combination with reducing agents such as sodium bisulfite and iron(II) sulfate or redox systems where the reducing component is an aliphatic and aromatic sulfinic acid, such benzenesulfinic acid and toluenesulfinic acid or derivatives thereof, such as Mannich adducts of sulfinic acids, aldehydes and amino compounds as described in DE-A-1 3 01 566. The performance properties of the polymers may be further improved by postheating the polymer gels for a number of hours in the temperature range from 50 to 130° C. and preferably from 70 to 100° C.

The gels obtained are neutralized, for example to 0-100 mol %, preferably 5 and 90 mol %, especially between 25 and 80 mol %, very preferably between 30 and 55 mol % and between 70 and 75 mol %, based on monomer used, for which the customary neutralizing agents can be used, preferably alkali metal hydroxides or oxides, but very preferably sodium hydroxide, sodium carbonate and sodium bicarbonate. The pH of the neutralized base polymer is typically between 5 and 7.5 and preferably between 5.6 and 6.2.

Neutralization is customarily effected by mixing in the neutralizing agent as an aqueous solution or preferably as a solid. Neutralization is preferably effected in the monomer solution, prior to polymerization. But its also possible to neutralize or postneutralize the polymeric gel. For this purpose the gel is mechanically comminuted, by means of a meat grinder for example, and the neutralizing agent is sprayed on, scattered over or poured on and then carefully mixed in. To effect homogenization, the resultant gel mass may be passed through the meat grinder again a number of times.

The neutralized gel mass is dried with a belt dryer or roller dryer until the residual moisture content is less than 10% by weight and especially less than 5% by weight. The dried hydrogel is then ground and sieved, the customary grinding apparatus being roll mills, pin mills or swing mills. The particles are typically from 100 to 1000 μm in size. Preferably not less than 80% by weight, preferably not less than 90% by weight and very preferably not less than 95% by weight of the particles are from 150 to 600 μm and preferably from 150 to 500 μm in size.

The CRC value [g/g] of base polymer A can be measured by the methods indicated in the description part and is preferably not less than 27, especially not less than 29 and more preferably not less than 31 and not more than 39 and preferably not more than 35.

The AUL 0.3 psi value [g/g] of base polymer A can be measured by the methods indicated in the description part and is preferably not less than 14, especially not less than 17 and more preferably not less than 21 and not more than 27 and preferably not more than 23.

The water-absorbing polymers postcrosslinked according to the present invention typically have a particle size in the range from 100 to 1000 μm. Preferably not less than 80% by weight, preferably not less than 90% by weight and very preferably not less than 95% by weight of the particles are from 150 to 600 μm and preferably from 150 to 500 μm in size.

The CRC value [g/g] of the water-absorbing polymers postcrosslinked according to the present invention can be measured by the methods indicated in the description part and is preferably not less than 20, more preferably not less than 24, even more preferably not less than 25, yet even more preferably not less than 26 and still more preferably not less than 30.

The AUL 0.7 psi value [g/g] of the water-absorbing polymers postcrosslinked according to the present invention can be measured by the methods indicated in the description part and is preferably not less than 15, more preferably not less than 21, even more preferably not less than 22, yet even more preferably not less than 23 and still more preferably not less than 25.

The SFC value [$cm^3 s/g$] of the water-absorbing polymers postcrosslinked according to the present invention can be measured by the methods indicated in the description part and is preferably not less than 80, more preferably not less than 100, even more preferably not less than 120, yet even more preferably not less than 130 and still more preferably not less than 135.

The present invention further provides the water-absorbing polymers which are obtainable by the process of the present invention.

The present invention also provides water-absorbing polymers having a CRC value of not less than 20, preferably not less than 24, more preferably not less than 25, even more preferably not less than 26, and yet even more preferably not less than 30, an AUL 0.7 psi value of not less than 15, preferably not less than 21, more preferably not less than 22, even more preferably not less than 23 and yet even more preferably not less than 25, an SFC value of not less than 80, preferably not less than 100, more preferably not less than 120, even more preferably not less than 130 and yet even more preferably not less than 135 and comprising not less than 80% by weight, preferably not less than 90% by weight and more preferably not less than 95% by weight of particles from 150 to 600 μm and preferably from 150 to 500 μm in size.

To ascertain the quality of postcrosslinking, the dried hydrogel is tested using the test methods described hereinbelow:

Methods:

Unless otherwise stated, the methods should be carried out at an ambient temperature of 23±2° C. and a relative humidity of 50±10%. The swellable hydrogel-forming polymer is thoroughly mixed through prior to measurement.

Centrifuge Retention Capacity (CRC)

This method measures the free swellability of the hydrogel in a teabag 0.2000±0.0050 g of dried hydrogel (particle fraction 106-850 μm) are weighed in a teabag 60×85 mm in size, which is subsequently filled. The teabag is placed for 30 minutes in an excess of 0.9% by weight sodium chloride solution (at least 0.83 l of sodium chloride solution/1 g of polymer powder). The teabag is subsequently centrifuged at 250 G for 3 minutes. The amount of liquid retained by the hydrogel is determined by weighing back the centrifuged teabag.

Centrifuge retention capacity can also be determined by the centrifuge retention capacity test method No. 441.2-02 recommended by EDANA (European Disposables and Nonwovens Association).

Absorbency Under Load (AUL) 0.7 psi (4830 Pa)

The measuring cell for determining the AUL 0.7 psi value is a Plexiglas cylinder 60 mm in internal diameter and 50 mm in height. Adhesively attached to its underside is a stainless steel sieve bottom having a mesh size of 36 μm. The measuring cell further includes a plastic plate having a diameter of 59 mm and a weight which can be placed in the measuring cell together with the plastic plate. The plastic plate and the weight together weigh 1344 g. AUL 0.7 psi is determined by determining the weight of the empty Plexiglas cylinder and of the plastic plate and recording it as $W_0$. Then 0.900±0.005 g of swellable hydrogel-forming polymer (particle size distribution 150-800 μm) is weighed into the Plexiglas cylinder and distributed very uniformly over the stainless steel sieve bottom. The plastic plate is then carefully placed in the Plexiglas cylinder, the entire unit is weighed and the weight is recorded as $W_a$. The weight is then placed on the plastic plate in the Plexiglas cylinder. A ceramic filter plate 120 mm in diameter and 10 mm in height and 0 in porosity is then placed in the middle of a Petri dish 200 mm in diameter and 30 mm in height and sufficient 0.9% by weight sodium chloride solution is introduced for the surface of the liquid to be level with the filter plate surface without the surface of the filter plate being wetted. A round filter paper 90 mm in diameter and <20 μm in pore size (S&S 589 Schwarzband from Schleicher & Schüll) is subsequently placed on the ceramic plate. The Plexiglas cylinder holding swellable hydrogel-forming polymer is then placed with plastic plate and weight on top of the filter paper and left there for 60 minutes. At the end of this period, the complete unit is taken out of the Petri dish from the filter paper and then the weight is removed from the Plexiglas cylinder. The Plexiglas cylinder holding swollen hydrogel is weighed out together with the plastic plate and the weight is recorded as $W_b$.

Absorbency under load (AUL) is calculated as follows:

$$AUL0.7\ psi[g/g]=[W_b-W_a]/[W_a-W_0]$$

The absorbency under load can also be determined by the absorption under pressure test method No. 442.2-02 recommended by EDANA (European Disposables and Nonwovens Association).

Absorbency Under Load (AUL) 0.3 psi (2070 Pa)

The measurement is carried out similarly to AUL 0.3 psi. The weight of the plastic plate and the weight are together 576 g.

Saline Flow Conductivity (SFC)

The saline flow conductivity of a swollen gel layer under a confining pressure of 0.3 psi (2070 Pa) is determined as described in EP-A-0 640 330 as the gel layer permeability of a swollen gel layer of superabsorbent polymer, although the apparatus described on page 19 and in FIG. 8 of the previously cited patent application was modified to the effect that the glass frit (40) is no longer used, the piston (39) is made of the same plastic material as the cylinder (37) and now contains 21 equally sized holes uniformly distributed over the entire contact surface. The procedure and also evaluation of the measurement remains unchanged compared with EP-A-0 640 330. The flow rate is recorded automatically.

The saline flow conductivity (SFC) is calculated as follows:

$$SFC[cm^3s/g]=(F_g(t=0)\times L_0)/(d\times A\times WP),$$

where $F_g(t=0)$ is the flow rate of NaCl solution in g/s obtained from a linear regression analysis of the $F_g(t)$ data of the flow rate determinations by extrapolation to t=0; $L_0$ is the thickness of the gel layer in cm; d is the density of the NaCl solution in $g/cm^3$; A is the area of the gel layer in $cm^2$; and WP is the hydrostatic pressure above the gel layer in $dyn/cm^2$.

Flow Rate (FLR)

This method determines the rate at which the swellable hydrogel-forming polymer flows through a funnel. 100±0.01 g of dried hydrogel are weighed into a sealable metal funnel. The weight of the swellable hydrogel-forming polymer is recorded as $W_1$. The funnel corresponds to German industrial specification DIN 53492. The efflux pipe of the funnel is 145.0±0.5 mm in height and 10.00±0.01 mm in internal diameter. The angle of inclination of the funnel's wall relative to the horizontal is 20°. The metal funnel is grounded. The funnel is subsequently opened and the time taken for the funnel to empty. The time is noted as t.

The measurement is carried out twice. The difference between the two measured values obtained must not be more than 5%.

The flow rate (FLR) is calculated as follows:

$$FLR[g/s]=W_1/t$$

The flow rate can also be determined by the flowrate test method No. 450.2-02 recommended by EDANA (European Disposables and Nonwovens Association).

Pour-Out Weight (ASG)

This method determines the density of the swellable hydrogel-forming polymer after pouring out. The measurement is carried out with a cylindrical pycnometer conforming to DIN 53466. The pycnometer has a volume of 100.0±0.5 ml, an internal diameter of 45.0±0.1 mm and a height of 63.1±0.1 mm. The pycnometer is weighed empty. The weight is noted as $W_1$. About 100 g of dried hydrogel are weighed into a sealable metal funnel. The funnel corresponds to German industrial specification DIN 53492. The efflux pipe of the funnel is 145.0±0.5 mm in height and 10.00±0.01 mm in internal diameter. The angle of inclination of the funnel's wall relative to the horizontal is 200. The metal funnel and the pycnometer are grounded. The funnel is subsequently emptied into the pycnometer, with excess swellable hydrogel-forming polymer overflowing. The overflowed swellable hydrogel-forming polymer is scraped off by means of a spatula. The filled pycnometer is weighed and the weight recorded as $W_2$.

The measurement is carried out twice. The difference between the two measured values obtained must not be more than 5%.

The pour-out weight (ASG) is calculated as follows:

$$ASG[g/ml]=[W_2-W_1]/V$$

The pour-out weight can also be determined by the density test method No. 460.2-02 recommended by EDANA (European Disposables and Nonwovens Association).

Surface Tension of Aqueous Extract 0.50 g of hydrogel-forming polymer is weighed into a small glass beaker and admixed with 40 ml of a 0.9% by weight sodium chloride solution by stirring the contents of the beaker with a magnetic stirrer bar at 500 rpm for 3 minutes before the contents are allowed to settle for 2 minutes. Finally, the surface tension of the supernatant aqueous phase is measured with a K10-ST digital tensiometer or a comparable platinum plate instrument (from Kruess).

Particle Size Distribution

The particle size distribution can be determined by the particle size distribution—sieve fractionation test method No. 420.2-02 recommended by EDANA (European Disposables and Nonwovens Association). All that is needed in addition is a 500 μm sieve.

It is alternatively possible to use a photographic method which has previously been calibrated against a sieve standard.

16 h Extractables

The level of extractable constituents in the hydrogel-forming polymer can be determined by the determination of extractable polymer content by potentiometric titration test method No. 470.2-02 recommended by EDANA (European Disposables and Nonwovens Association).

pH

The pH of the hydrogel-forming polymer can be determined by the determination of pH test method 400.2-02 recommended by EDANA (European Disposables and Nonwovens Association).

Free Swell Rate (FSR) 1.00 g (=W1) of the dry hydrogel-forming polymer is weighed into a 25 ml glass beaker and is uniformly distributed on the bottom of the glass beaker. 20 ml of a 0.9% by weight sodium chloride solution are then dispensed into a second glass beaker, the contents of this beaker are rapidly added to the first beaker and a stopwatch is started. As soon as the last drop of salt solution has been absorbed, confirmed by the disappearance of the reflection on the liquid surface, the stopwatch is stopped. The exact amount of liquid poured from the second beaker and absorbed by the polymer in the first beaker is accurately determined by weighing back the second beaker (=W2). The time needed for the absorption, which was measured with a stopwatch, is denoted t.

The free swell rate (FSR) is calculated as follows:

$$FSR[g/gs]=W2/(W1\times t)$$

However, when the moisture content of the hydrogel-forming polymer is more than 3% by weight, the weight W1 must be corrected for this moisture content.

EXAMPLES

Example 1

A base polymer was produced by the continuous kneader process described in WO-A-01/38402. To this end, acrylic acid was continually neutralized with aqueous sodium hydroxide solution and diluted with water such that the degree of neutralization of the acrylic acid was 73 mol % and the solids content (=sodium acrylate and acrylic acid) of this solution was about 37.3% by weight. The crosslinker used was polyethylene glycol 400 diacrylate in an amount of 1.00% by weight based on acrylic acid monomer and the crosslinker was continuously admixed into the monomer stream. Initiation was likewise effected by continuous admixture of aqueous solutions of the initiators sodium persulfate, hydrogen peroxide and ascorbic acid.

The polymer was dried on a belt dryer, ground and then sized to a particle size from 150 to 500 μm.

The base polymer thus produced had the following properties:

CRC=32.8 g/g
AUL 0.3 psi=21.3 g/g
FLR=10.6 g/s
ASG=0.67 g/cm$^3$
Extractables (16 h)=9.2% by weight
pH=6.1
Particle Size Distribution
>600 μm<0.1% by weight
>500 μm=2% by weight
>150 μm=96.7% by weight
>45 μm=1.1% by weight
<45 μm<0.1% by weight This base polymer was sprayed with the two surface-postcrosslinking solutions and subsequently heat-treated on a pilot plant. The spraying took place in a Schuggi® 100 D Flexomix mixer with gravimetric metering of the base polymer feed and continuous, mass flow controlled liquid metering through two-material nozzles. Two separate nozzles were installed in the Flexomix, and each of the two solutions was fed separately to its nozzle.

The postcrosslinking solution B contained 5.0% by weight of 2-oxazolidinone, 23.6% by weight of isopropanol, 5.0% by weight of 1,2-propanediol and 66.4% by weight of water and was sprayed onto the polymer through a separate two-material nozzle at a rate of 2.42% by weight based on polymer.

The postcrosslinking solution C contained 23.0% by weight of aluminum sulfate in water and was sprayed onto the polymer through a two-material nozzle at a rate of 1.08% by weight based on polymer.

The moist polymer was transferred directly fallingly from the Schuggi mixer into a NARA NPD 1.6 W (GMF Gouda B.V., Netherlands) reaction dryer. The throughput rate of base polymer A was 60 kg/h (dry) and the product temperature of the steam-heated dryer at the dryer outlet was about 178° C. The dryer was connected on the downstream side to a cooler, which rapidly cooled the product down to about 50° C. The exact residence time in the dryer can be precisely predetermined by means of the throughput rate of the polymer through the dryer and also the weir height (70% here).

The end product obtained had the following properties:
CRC=25.6 g/g
AUL 0.7 psi=22.8 g/g
SFC=137×$10^{-7}$ cm$^3$s/g
FSR=0.29 g/gs
Particle Size Distribution
>600 μm=0.6% by weight
>500 μm=3.0% by weight
>400 μm=31.3% by weight
>300 μm=33.4% by weight
>150 μm=30.3% by weight
>106 μm=1.3% by weight
<106 μm<0.1% by weight Example 2

A base polymer was produced in a List ORP 250 semicommercial reactor by the continuous kneader process described in WO 01/38402. To this end, acrylic acid was continually neutralized with aqueous sodium hydroxide solution and diluted with water such that the degree of neutralization of the acrylic acid was 72 mol % and the solids content (=sodium acrylate and acrylic acid) of this solution was about 38.8% by weight. The crosslinker used was trimethylolpropane 18 EO triacrylate in an amount of 1.10% by weight based on acrylic acid monomer and the crosslinker was continuously admixed into the monomer stream. Initiation was likewise effected by continuous admixture of aqueous solutions of the initiators sodium persulfate, hydrogen peroxide and ascorbic acid. The initiator quantities based on acrylic acid were 0.145% by weight of sodium persulfate, 0.0009% by weight of hydrogen peroxide and 0.003% by weight of ascorbic acid.

The polymer was dried on a belt dryer, ground and then sized to a particle size from 150 to 500 μm.

The base polymer thus produced had the following properties:
CRC=33.5 g/g
AUL 0.3 psi=15.4 g/g
Extractables (16 h)=10.0% by weight
pH=6.0
Particle Size Distribution
>600 μm=0.1% by weight
>500 μm=4.7% by weight
>150 μm=92.1% by weight
>45 μm=2.9% by weight
<45 μm=0.2% by weight This base polymer was sprayed with the two surface-postcrosslinking solutions and subsequently heat-treated on a pilot plant. The spraying took place in a Schuggi® 100 D Flexomix mixer with gravimetric metering of the base polymer feed and continuous, mass flow controlled liquid metering through two-material nozzles. Two separate nozzles were installed in the Flexomix, and each of the two solutions was fed separately to its nozzle.

The postcrosslinking solution B contained 2.5% by weight of 2-oxazolidinone, 28.15% by weight of isopropanol, 2.5% by weight of 1,2-propanediol, 0.7% by weight of sorbitan monococoates and 66.15% by weight of water and was sprayed onto the polymer through a separate two-material nozzle at a rate of 3.5% by weight based on polymer.

The postcrosslinking solution C contained 26.8% by weight of aluminum sulfate in water and was sprayed onto the polymer through a two-material nozzle at a rate of 1.6% by weight based on polymer.

The moist polymer was transferred directly fallingly from the Schuggi mixer into a NARA NPD 1.6 W (Gouda, Netherlands) reaction dryer. The throughput rate of base polymer was 60 kg/h (dry) and the product temperature of the steam-heated dryer at the dryer outlet was about 179° C. The dryer was connected on the downstream side to a cooler, which rapidly cooled the product down to about 50° C. The exact residence time in the dryer can be precisely predetermined by means of the throughput rate of the polymer through the dryer and also the weir height (70% here).

The end product obtained had the following properties:
CRC=26.1 g/g
AUL 0.7 psi=23.2 g/g
SFC=120×$10^{-7}$ cm$^3$s/g
FLR=11.2 g/s
ASG=0.70 g/cm$^3$
Particle Size Distribution
>600 μm=0.1% by weight
>500 μm=2.0% by weight
>300 μm=65.3% by weight
>150 μm=28.4% by weight
<150 μm=4.2% by weight Example 3

Comparative Example

Example 1 was repeated except that the two surface-postcrosslinking solutions were mixed together before being nozzled onto the base polymer. The Schuggi mixer became completely blocked a short time after the surface postcrosslinking in the pilot plant began and the run had to be discontinued.

Example 4

Comparative Example

Example 2 was repeated except that the two surface-postcrosslinking solutions were mixed together in a separate tank before being nozzled onto the base polymer. A short time after the surface postcrosslinking in the pilot plant began a rapidly progressing cloggage of the Schuggi mixer occurred and the run had to be discontinued.

We claim:

1. A water-absorbing polymer having a saline flow conductivity of not less than 80×$10^{-7}$ cm$^3$s/g and comprising not less than 80% by weight of particles between 150 and 600 μm in size, said polymer prepared by a process comprising mixing a base polymer A with a first aqueous solution B of at least one surface postcrosslinker capable of forming covalent bonds with carboxyl groups and a second aqueous solution C of at least one polyvalent cation and thermally treated, wherein said base polymer A is based on an at least 50% neutralized acid-functional monomer and said solutions B and C are metered wholly or partly concurrently through separate nozzles, the concentration of the at least one surface postcrosslinker on said base polymer A being in the range from 0.01% to 0.5% by weight and the concentration of the at least one polyvalent cation on said base polymer A being in the range from 0.001% to 0.5% by weight, based in each case on said base polymer A, and wherein said base polymer A has a deagglomerating assistant added to it in an amount of up to 0.01% by weight.

2. The polymer of claim 1 comprising not less than 80% by weight of particles between)150 and 500 μm in size.

3. The polymer of claim 1 comprising not less than 95% by weight of particles between 150 and 500 μm in size.

4. The polymer of claim 1 having a saline flow conductivity of not less than $100 \times 10^{-7}$ cm$^3$s/g.

5. The polymer of claim 1 having a saline flow conductivity of not less than $120 \times 10^{-7}$ cm$^3$s/g.

6. The polymer of claim 1 having a centrifuge retention capacity of not less than 24 g/g and an absorbency under load at 4830 Pa of not less than 21 g/g.

7. The polymer of claim 1 wherein the deagglomerating assistant is metered such that a surface tension of an aqueous extract of the swollen water-absorbing polymer after addition of said deagglomerating assistant is at least 0.065 N/m.

8. The polymer of claim 1 wherein the concentration of the at least one surface postcrosslinker on said base polymer A, based on said base polymer A, is in the range from 0.1% by weight to 0.5% by weight.

9. The polymer of claim 1 wherein the concentration of the at least one polyvalent cation on said base polymer A, based on said base polymer A, is in the range from 0.02% by weight to 0.1% by weight.

* * * * *